United States Patent [19]

Brown

[11] Patent Number: 5,137,967
[45] Date of Patent: Aug. 11, 1992

[54] HYDRAZINE EXTENDED AQUEOUS POLYURETHANE

[75] Inventor: R. Alan Brown, Williamsville, N.Y.

[73] Assignee: Reichhold Chemicals, Inc., Durham, N.C.

[21] Appl. No.: 549,169

[22] Filed: Jul. 6, 1990

[51] Int. Cl.$^5$ .................. C08L 83/00; C08J 3/02; C08K 5/24; C08K 5/54

[52] U.S. Cl. ................... 524/840; 524/839; 428/262; 428/424.7

[58] Field of Search ............ 524/589, 567, 591, 840, 524/839; 528/61, 71; 428/262, 424.7

[56] References Cited

U.S. PATENT DOCUMENTS

| | | | |
|---|---|---|---|
| 3,479,310 | 11/1969 | Dieterich et al. | 524/589 |
| 3,770,681 | 11/1973 | Witt et al. | 524/840 |
| 3,929,726 | 12/1975 | Schollenberger et al. | 524/91 |
| 4,017,493 | 4/1977 | Ferment | 427/257 |
| 4,046,729 | 9/1977 | Scriven et al. | 524/589 |
| 4,066,591 | 1/1978 | Scriven et al. | 428/262 |
| 4,092,286 | 5/1978 | Noll et al. | 428/424 |
| 4,108,814 | 8/1978 | Reiff et al. | 528/71 |
| 4,147,679 | 4/1979 | Scriven et al. | 428/262 |
| 4,183,836 | 1/1980 | Wolfe, Jr. | 524/840 |
| 4,206,255 | 6/1980 | Wenzel et al. | 427/393.5 |
| 4,237,264 | 12/1980 | Noll et al. | 528/67 |
| 4,269,748 | 5/1981 | Nachtkamp et al. | 428/423.1 |
| 4,335,029 | 6/1982 | Dabi et al. | 524/589 |
| 4,387,181 | 6/1983 | Brown et al. | 524/714 |
| 4,404,258 | 9/1983 | Loewrigkeit et al. | 428/424.6 |
| 4,436,784 | 3/1984 | Ehrhart | 428/423.1 |
| 4,447,571 | 5/1984 | Dabi et al. | 524/192 |
| 4,507,431 | 3/1985 | Stutz et al. | 524/840 |
| 4,594,385 | 6/1986 | Thoma et al. | 524/839 |
| 4,652,466 | 3/1987 | Thoma et al. | 427/244 |
| 4,764,553 | 8/1988 | Mosbach et al. | 524/591 |
| 4,801,644 | 1/1989 | Coogan | 524/839 |
| 4,880,867 | 11/1989 | Gobel et al. | 524/567 |
| 4,983,662 | 1/1991 | Overbeek et al. | 524/840 |

*Primary Examiner*—John Kight, III
*Assistant Examiner*—Due Truong
*Attorney, Agent, or Firm*—Michael L. Dunn

[57] ABSTRACT

An aqueous dispersion of an anionic polyurethane, said polyurethane comprising a chain extended, aliphatic diisocyanatae containing, prepolymer; said prepolymer including carboxy groups neutralized with a tertiary amine composition comprising dimethylaminoethanol, said prepolymer being chain extended with a diamine comprising hydrazine.

The invention also includes a film formed from the dispersion and a floor covering coated with such film. The film may be crosslinked with an agent such as melamine-formaldehyde resin.

29 Claims, No Drawings

HYDRAZINE EXTENDED AQUEOUS POLYURETHANE

BACKGROUND OF THE INVENTION

This invention relates to aqueous polyurethane compositions and to films made from such compositions. The invention also relates to yellowing resistant floor coverings.

Large numbers of polyurethane coating compositions are known. Many of these unfortunately are solvent solutions or dispersions rather than aqueous solutions or dispersions. Solvents are often used in such compositions because of improved solubility and better water resistance in a coated film. Such systems which are moisture cured, for example, are described in U.S. Pat. Nos. 3,929,726; 4,017,493 and 4,436,784. U.S. Pat. No. 3,929,726, for example, describes solvent based color stabilized polyurethanes containing organic hydrazides (not hydrazine). U.S. Pat. Nos. 4,017,493 and 4,436,784 discloses moisture curable polyurethanes for coating vinyl substrates.

Unfortunately, the advantages of solvent based systems are offset by disadvantages, i.e., high solvent cost and pollution.

Attempts were therefore made to make a water dilutable polyurethane, which would have the desirable characteristics of the solvent systems, i.e. high solution solids, good film strength and good water resistance. Such attempts have been more or less successful, e.g. as described in such patents as U.S. Pat. Nos. 4,764,553; 4,652,466; 4,594,385; 4,147,679; 4,447,571; 4,269,748; 4,046,729 and 4,066,591. All of such water dispersed compositions nevertheless have had at least some disadvantages.

For example, the dispersions might not be as stable as desired, films formed from the dispersions may be too water sensitive or other physical properties may not be a good as desired; the products are made from materials that are costly or difficult to manufacture; undesirable leachable additives such as surfactants are employed and yellowing characteristics at curing temperatures are not as good as desired.

Some of such materials are water-based colloidal anionic polyurethanes, made by diamine chain extension of aqueous dispersions of isocyanate prepolymers containing salt groups which are generally tertiary amine carboxylates where the carboxylate group is on the prepolymer backbone. Polyurethanes of this type may be used in conjunction with melamineformaldehyde curing agents in topcoats for vinyl flooring. These coating compositions typically exhibit yellowing when baked on the vinyl at temperatures in the range of 180-200° C.

Even when the term "non-yellowing" is used in conjunction with such materials, e.g. as described in the foregoing patents, the term is relative since yellowing characteristics are still not as good as desired.

BRIEF DESCRIPTION OF THE INVENTION

We now find, surprisingly, that if the chain extender is hydrazine and the carboxylate neutralizer is N,N-dimethylaminoethanol (DMAE), the thermally-induced yellowing can be avoided. This behavior for the particular combination of hydrazine and DMAE is completely unexpected considering the yellowing obtained with many other extender/neutralizer combinations, even those with hydrazine and other neutralizers such as N,N-diethylaminoethanol, triethylamine, or N-methyldiethanolamine.

In accordance with the invention, there is therefore provided an aqueous dispersion of an anionic polyurethane where the polyurethane comprises a chain extended aliphatic, diisocyanate containing, prepolymer. The prepolymer includes carboxy groups neutralized with a tertiary amine composition comprising dimethylaminoethanol. The prepolymer is chain extended with a diamine comprising hydrazine.

The invention also includes films made from the dried dispersion and synthetic floor covering comprising a synthetic resin base coated with such a film.

DETAILED DESCRIPTION OF THE INVENTION

The aqueous dispersion of anionic polyurethane of the invention comprises polyurethane particles of a size of from molecular level to 0.1 microns. The average particle size is usually from about $0.01\mu m$ to $0.1\mu m$ and is often in the range of about $0.05\mu m$. The dispersion usually contains from about 10 to about 40 weight percent solids.

To assist in the preparation of the prepolymer a cosolvent such as N-methylpyrrolidone or dimethylformamide may be used. High boiling cosolvents are preferred.

In general, the finished dispersion has a weight average molecular weight of from about 10,000 to about 100,000 and usually between about 20,000 and about 60,000.

The polyurethane usually has a salt number of from 10 to 100 wherein the salt comprises carboxy groups neutralized with a tertiary amine composition comprising dimethylaminoethanol. At least fifty weight percent of the tertiary amine composition must be dimethylaminoethanol with the balance being other tertiary aliphatic amines suitable for forming a quaternary salt, e.g. triethyl amine, N-ethylpiperidine and N-methylmorpholine, etc.

As previously discussed, the polyurethane comprises a chain extended aliphatic diisocyanate containing prepolymer. The prepolymer includes the carboxy groups neutralized with the tertiary amine composition previously described.

The prepolymer is an isocyanate containing prepolymer which is the reaction product of diisocyanate and a diol blend comprising a polyester diol. The diol may be a blend of the polyester diol and other diols such as polyether diols; ethylene glycol; 1,2-propylene glycol; 1,4-butanediol; 1,6-hexanediol and neopentyl glycol; provided that such diols should not be used in quantities which significantly adversly affect the properties of the polyurethane. Usually at least 50 weight percent of the diol blend comprises polyester diol.

The diol blend must also include diols having pendant carboxy groups which will not readily react with the diisocyanate. This is usually accomplished by including from 5-15 weight percent of a short chain diol containing a relatively non-reactive carboxy group, such as dimethylol propionic acid, into the diol blend. Alternatively, the polyester diol may be made with such pendant groups. Sufficient dimethylolpropionic acid or other appropriate polyol acid should be used to obtain an acid or salt number of from 10 to 100, preferably 10 to 60 and most preferably 20-40, in the finished product. Acid or salt number may be defined as the number of equivalents of acid or salt groups per gram of product times 56,100.

Cyclohexanedimethanol (CHDM) and neopentyl glycol may be a component of the diol to be reacted with the diisocyanate to increase hardness of the product.

The polyester diol usually has a number average molecular weight of between 1,000 and 3,000; although, lower or higher molecular weights may be used.

The polyester diol is usually made by the reaction of a diol with an acid or acid anhydride. Suitable diols to make the polyester include ethylene glycol; 1,2-propylene glycol; 1,3-propylene glycol; 1,4-butanediol; 1,3-butanediol; 1,6-hexanediol; and 2,2-dimethyl-1,3-propanediol (neopentyl glycol). If it is desired to incorporate pendant carboxy groups into the polyester diol, dimethylolpropionic acid, or another diol having relatively low carboxy reactivity may be included in the diol mixture used to make the polyester diol.

Suitable acids and anhydrides to make the polyester diol include adipic acid; isophthalic acid; terephthalic acid; succinic acid; succinic anhydride; phthalic acid; phthalic anhydride; cyclohexane-1,4-dicarboxylic acid; and dodecanedioic acid. A preferred polyester diol comprises the reaction product of an acid blend comprising adipic acid and a glycol blend comprising 1-6-hexanediol and neopentyl glycol.

Suitable diisocyanates which may be reacted with the diol blend include tetramethylxylylene diisocyanate (TMXDI); isophorone diisocyanate (IPDI) and 4,4'-diisocyanatodicyclohexylmethane (DICHM). The preferred diisocyanate is 4,4'-diisocyanatodicyclohexylmethane which may be blended with other aliphatic isocyanates. At least 50 weight percent DICHM should be used. Aliphatic, as used in this context means that at least 90 weight percent of the diisocyanate has the isocyanate groups attached to non-aromatic carbon atoms. Non-aliphatic (aromatic) diisocyanates are generally not preferred since they tend to add color. Such aromatic diisocyanates, if used, must therefore be used sparingly and carefully.

The reaction temperature to form the polyurethane prepolymer is usually from about 80 to 125° C. The reaction time is usually from about 30 minutes to ten hours.

After forming the polyurethane, the pendant carboxy groups are neutralized, as previously discussed, with a triamine which comprises at least 50 weight percent N,N-dimethylaminoethanol (DMAE). Such neutralization is usually done at from about 50 to 100° C. for from about 1 to 30 minutes. Lower temperatures and higher temperatures may also be used, but are not necessary.

After neutralization the dispersion is chain extended with a diamine comprising at least 75 equivalent percent hydrazine. Hydrazine as used herein means hydrazine and substituted hydrazines having two active amine groups. In addition to hydrazine, examples of diamines which can be used are alkylene diamine such as ethylene diamine, propylene diamine, cyclohexane diamines and isophorone diamine. Diamines in addition to hydrazine should be used cautiously since they tend to promote yellowing. The diamines are usually blended prior to reacting with the prepolymer dispersion at 20 to 50° C. Stoichiometric chain extension with the hydrazine containing diamine is not necessary or desirable. Usually enough diamine chain extender is used to react with from about 30 to 80 percent of the isocyanate groups.

To react isocyanate groups which do not react with diamine, the mixture may be warmed to complete the reaction with water. A wide temperature range may be used; however, 50 to 100° C. is the usual range. The reaction time is usually from 20 to 90 minutes.

In a preferred embodiment, the isocyanate containing prepolymer has a molecular weight of from about 2,000 to about 20,000 and has the structural formula

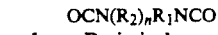

where $R_2$ is independently at each occurrence,

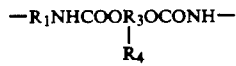

or $-R_1NHCOOR_6OCONH-$ where $R_1$ is independently at each occurrence, the backbone residue of a diisocyanate selected from 4,4'diisocyanatodicyclohexylmethane, tetramethylenexylylene diisocyanate or isophorone diisocyanate; $R_3$ is independently at each occurrence, the backbone residue comprising a glycol selected from 2, 2-dimethylolpropionic acid, and 1,4-bis(-hydroxylmethyl) cyclohexane; $R_4$ is $-H$ or $-COO^-R_5^+$ where $R_5^+$ is the quaternary salt cation residue of dimethylaminoethanol; $R_6$ is independently at each occurrence, a polyester backbone of a number average molecular weight of about 1000 to 3000, formed by the reaction of a dicarboxylic acid or carboxylic acid anhydride with a polyol; and n is an integer of 1 through 10; provided that, sufficient $R_2$ is

where $R_4$ is $-COO^-R_5^+$, to provide a prepolymer salt number of 10 to 60; at least one $R_2$ groups is $-R_1NH\text{-}COOR_6OOCHN$; and at least 50 numerical percent of $R_1$ is the residue of 4,4'-diisocyanatodicyclohexylmethane.

A preferred anionic polyurethane of the invention has a weight average molecular weight of from 10,000 to 60,000 and has the structural formula $H(R_7)_aNH_2$ where $R_7$ is independently at each occurrence

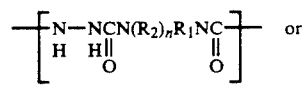

where a is an integer of from 2 to 15; provided that, at least 50 numerical percent of $R_7$ is

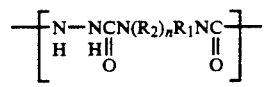

where $R_2$ and $R_1$ are as previously described.

The dispersion is particularly suitable for reaction with a crosslinking agent such as melamine formaldehyde resin (2,4,6-tris(bisalkoxyalkyl) melamine), to form films or layers which are non-yellowing, e.g. for use as coatings on synthetic resin floor coverings, such as polyvinylchloride backed floor coverings which may be reinforced. Such reaction readily occurs when a film of a mixture of the dispersion and such a crosslinking agent is dried and cured at a temperature of from about 180 to 220° C. From one to five minutes is usually all that is required, at such temperatures, to cure the film. At about 30 percent solids in the dispersion and 50 percent reaction with hydrazine, about 7 parts of the dispersion reacts well with about one part of melamine resin.

EXAMPLE 1

A mixture of 506.4 parts of a polyester diol of 2066 molecular weight made from adipic acid and a blend of about 60 mole % 1,6-hexanediol and 40 mole % neopentyl glycol, 126.8 parts of 1,4-bis (hydroxymethyl) cyclohexane, 68 parts of dimethylolpropionic acid, 662 parts of N-methylpyrrolidone, 521 6 parts of 4,4'-diisocyanatodicyclohexylmethane, 3.2 parts of diphenylisodecylphosphite antioxidant and 3.2 parts of octadecyl 3-(3',5'-di-tert-butyl-4'-hydroxyphenyl)propionate antioxidant is heated under a nitrogen atmosphere in a five-liter glass flask fitted with a thermometer, stirrer, reflux condenser, nitrogen inlet, and a drying tube. After heating to 107° C., the mixture was stirred under nitrogen at 105-110° C. for 5.5 hours and then cooled to 55° C. During the 105-110° C. hold period, several samples were removed for isocyanate assay, with the last indicting an isocyanate content of 1.79%. To the 1774 parts of prepolymer remaining in the flask at 55° C., was added 43.13 parts of N,N-dimethylaminoethanol, enough to neutralize all the acid groups present. After 15 minutes of stirring, the temperature was 54° C. Then 1710 parts of water at 20° C. was added to the stirred solution over a two-minute interval. The result was a 38° C. dispersion of the prepolymer in water. To this dispersion was added a solution of 6.08 parts of hydrazine in 195.1 parts of water at 20° C. over a five-minute interval with good stirring. The amount of hydrazine used was enough to react with 50% of the isocyanate groups present. The 38° C. dispersion was heated to 60° C. over a 22-minute interval and held at 60° C. for one hour. Then it was cooled to 25° C. The resulting dispersion contained 31.1% nonvolatiles and was diluted with 100 parts of water to give the finished dispersion at 30.1% nonvolatiles. The colloidal, transparent dispersion had a viscosity of 0.4 stoke at 25° C., a pH of 7.8, and an amine value of 6.7. It could be frozen at −15° C. and thawed at 20° C. without any gelation. The dispersion contained 0.08 ppm of hydrazine as determined by ASTM test D1385 published in 1978, when a blank using the dispersion of example 4 was used as a control. Evaporation of a thin film of the dispersion to dryness yielded a clear film which had a tensile strength of 4,190 psi at an ultimate elongation of 180%; its Shore D hardness was 55, its Sward rocker hardness was 53.

When 7 parts of the dispersion were mixed with one part of melamine formaldehyde resin, and a 0.003 inch thick layer of the solution was dried in an air oven for two minutes at 199° C., no yellowing resulted.

EXAMPLES 2-13

The same procedures were used as in Example 1, and the same prepolymer formula was always used. In each case, the neutralizer and chain extenders used were as listed in Table 1. In all cases, the amount of neutralizer was enough to neutralize all the acid groups, and the amount of chain extender was selected to be enough to react with 50% of the isocyanate groups present in the prepolymer. All products were made in the range of 30.0 to 30.7% nonvolatiles and all had a viscosity of 0.4 stoke at 25° C. Physical properties of thin films are listed in Table 2.

When each product in Examples 2 to 13 was mixed with Cymel 03 as in Example 1 and a film cured at 199° C. for two minutes, yellowing was always observed, with the results listed in Table 1. In all cases (Examples 2, 10, and 11) of hydrazine extension with neutralizers other than N,N-dimethylaminoethanol, the yellowing was slight but still very noticeable. Ethylenediamine also gave slight but noticeable yellowing, whether with triethylamine neutralization (Example 3) or N,N-dimethylaminoethanol neutralization (Example 12). With all the other extenders (Examples 4-9), triethylamine neutralization gave substantial yellowing, and from Example 13 it is apparent that even the use of N,N-dimethylaminoethanol with a typical extender such as isophoronediamine gave substantial yellowing.

EXAMPLE 14

A prepolymer was prepared as in Example 1 using the same ingredients and same ratios of ingredients. It contained 1.70% isocyanate and had a viscosity of 643 stokes at 25° C. To 397 parts of the prepolymer in a flask at 55° C. was added 11.62 parts of N-ethylpiperidine which was enough to neutralize all the carboxylic acid groups present. The exotherm of neutralization increased the temperature to 58° C. After 12 minutes of stirring, 447.5 parts of water at 29° C. was added over a two-minute interval with good stirring. The result was a 45° C. dispersion of prepolymer in water. To this dispersion was added a solution of 1.28 parts of hydrazine in 7.01 parts of water at 20° C. over a four-minute interval with good stirring. The amount of hydrazine was enough to react with 50% of the isocyanate groups present. The 45° C. dispersion was heated to 60° C. over a 19-minute interval and held at 60° C. for one hour. Then it was cooled to 25° C. The resulting colloidal, transparent dispersion contained 30.8% nonvolatiles and had a viscosity of 0.6 stoke at 25° C., a pH of 7.7 and an amine value of 7.3. Evaporation of a thin layer of the dispersion to dryness yielded a clear film 0.008 inch thick which had a tensile strength of 4,790 psi at an ultimate elongation of 190%; its Shore D hardness was 55.

When 7 parts of the dispersion were mixed with one part of Cymel 303, and a 0.003 inch thick layer of the solution was dried in an air oven for two minutes at 199° C., the cured film was very slightly yellow.

EXAMPLE 15

A prepolymer was prepared as in Example 1 using the same ingredients and same ratios of ingredients. It contained 1.75% isocyanate. To 714 parts of prepolymer at 69° C. was added 18.9 g of N-methylmorpholine, enough for complete neutralization of the carboxylic acid groups. After 5 minutes of stirring, the mixture was homogeneous and the heat of neutralization had increased the temperature to 74° C. When an attempt was made to disperse 500 parts of the neutralized prepolymer at 74° C. in 589 parts of water at 18° C., a granular mixture of poorly dispersed neutralized prepolymer in water resulted when only 258 g of neutralized prepolymer had been added.

EXAMPLE 16

Since Example 15 did not give a dispersion using N-methylmorpholine and a prepolymer with acid value of 23.3, the experiment described here using prepolymer with an acid value of 38.3 was performed with N-methylmorpholine neutralizer.

A mixture of 187.8 parts of a polyester diol of 2044 molecular weight made from adipic acid and a blend of about 60 mole % 1,6-hexanediol and about 40 mole % neopentylglycol, 30.07 parts of 1,4-bis(hydroxymethyl)-cyclohexane, 41.68 parts of dimethylolpropionic acid, 246,37 parts of N-methylpyrrolidone, 195.6 parts of 4,4'-diisocyanatodicyclohexylmethane, 1.2 parts of diphenylisodecylphosphite and 1.2 parts of octadecyl 3-(3',5'-di-tert-butyl-4'-hydroxyphenyl) propionate was heated under a nitrogen atmosphere in a two-liter glass flask fitted as described in Example 1. The mixture was heated to 107° C. and, during the course of a six-hour reaction at 107° C., a total of 68.62 parts of the solution were removed for viscosity and isocyanate assays. The sample taken at the sixth hour indicated the isocyanate content to be 1.76% and the viscosity to be 894 stokes at 25° C. At this point, the prepolymer solution was cooled at 25° C. and stored overnight. The next morning, it was heated to 54° C. and to it was added 29.44 parts of N-methylmorpholine. After stirring for ten minutes to insure uniformity, 705.11 parts of water at 20° C. were added over a two-minute interval with rapid stirring of the 53° C. prepolymer. Immediately after this, a solution of 2.13 parts of hydrazine in 11.60 parts of water at 20° C. was added over a two-minute period with good mixing. The resulting 40° C. dispersion was heated to 60° C. over one half-hour and held at 60° C. for one hour prior to cooling to 25° C. The resulting colloidal, gel-free dispersion contained 30.4% nonvolatiles, had a viscosity of 0.42 stoke at 25° C., a pH of 7.2, and an amine value of 11.8. Evaporation of a thin layer of the dispersion to dryness at room temperature and then subsequent drying at 70° C. overnight gave a 0.007 inch thick hazy film which had a tensile strength of 4,700 psi at an ultimate elongation of 210%; its Shore D hardness was 57.

When 7 parts of the dispersion were mixed with one part of Cymel 303 and a 0.003 inch thick layer of the solution was dried in an air oven for two minutes at 199° C., the cured film was slightly yellow.

TABLE 1

Extenders, Neutralizers and Baking Tests

| Example | Experiment Number | Chain Extender[1] | Neutralizer[2] | Result of 199° C.- 2 min. Bake Test[3] |
|---|---|---|---|---|
| 1 | S208 | hydrazine | DMAE | no yellowing |
| 2 | R972 | hydrazine | TEA | slight yellowing |
| 3 | R936 | ethylenediamine | TEA | slight yellowing |
| 4 | S344 | isophoronediamine | TEA | yellowing |
| 5 | S334 | 3(methylamino-1-propylamine | TEA | yellowing |
| 6 | S43 | N-(aminoethyl)ethanolamine | TEA | yellowing |
| 7 | S142 | 1,2-diaminocyclohexane | TEA | yellowing |
| 8 | R991 | 2-methyl-1,5-pentanediamine | TEA | yellowing |
| 9 | S8 | neopentanediamine | TEA | yellowing |
| 10 | S467 | hydrazine | DEAE | slight yellowing |
| 11 | S478 | hydrazine | NMDEA | slight yellowing |
| 12 | S468 | ethylenediamine | DMAE | slight yellowing |
| 13 | S303 | isophoronediamine | DMAE | yellowing |
| 14 | S809 | hydrazine | NEP | very slight yellowing |
| 15 | 2455-45 | could not be extended since dispersion did not form | NMM | — |
| 16 | T230 | hydrazine | NMM | slight yellowing |

[1]In all cases, 50% of the amount needed for reaction with the isocyanate groups of the prepolymer was used.
[2]In all cases, enough was used to neutralized all the acid groups present in the prepolymer from the dimethylolpropionic acid. TEA = triethylamine, DEAE = N,N-diethylaminoethanol, NMDEA = N-methyldiethanolamine, NEP = N-ethyl-piperidine, NMM = N-methylmorpholine.
[3]Seven parts urethane dispersion plus one part Cymel 303; 0.003 inch thick wet films.

TABLE 2

Polyurethane Properties

| Example | Tensile Strength (psi)[1] | Ultimate Elongation (%)[1] | Shore D Hardness |
|---|---|---|---|
| 1 | 4190 | 180 | 55 |
| 2 | 4300 | 110 | 48 |
| 3 | 3850 | 80 | 56 |
| 4 | 4600 | 180 | 53 |
| 5 | 4910 | 160 | 55 |
| 6 | 3800 | 40 | 52 |
| 7 | 5680 | 240 | 53 |
| 8 | 4220 | 110 | 52 |
| 9 | 4760 | 150 | 55 |
| 10 | 3620 | 80 | 55 |
| 11 | 3250 | 110 | 51 |
| 12 | 4050 | 60 | 52 |
| 13 | 4890 | 90 | 53 |
| 14 | 4790 | 190 | 55 |
| 15 | — | — | — |
| 16 | 4700 | 210 | 57 |

[1]Measured on 0.004–0.009 inch thick films at a crosshead speed of 20 inches/minute at 25° C. All films were baked at 70° C. long enough to insure the absence of N-methylpyrrolidone, then allowed to stand at 25° C./50% relative humidity at least one day prior to testing at 25° C.

What is claimed is:

1. An aqueous dispersion of an anionic polyurethane, said polyurethane comprising a chain extended, aliphatic diisocyanate containing, prepolymer; said prepolymer including carboxy groups neutralized with a tertiary amine composition comprising dimethylaminoethanol, said prepolymer being chain extended with a diamine comprising hydrazine.

2. A film comprising a dried coating of the dispersion of claim 1.

3. A synthetic floor covering comprising a synthetic resin base coated with the film of claim 2.

4. The dispersion of claim 1 wherein the polyurethane has a weight average molecular weight of from about 10,000 to about 100,000.

5. The dispersion of claim 1 wherein the polyurethane has a weight average molecular weight of between 20,000 and 60,000.

6. The dispersion of claim 1 wherein the polyurethane has a salt number of from 10 to 100.

7. The dispersion of claim 1 wherein the dispersion contains from about 10 to about 40 weight percent solids.

8. The dispersion of claim 1 wherein the isocyanate containing prepolymer is the reaction product of a diol comprising a polyester diol and a diisocyanate.

9. The dispersion of claim 8 wherein the polyester diol has a number average molecular weight of between 1000 and 3000 and is the reaction product of an acid comprising adipic acid and a glycol blend comprising 1,6-hexane diol and neopentyl glycol.

10. The dispersion of claim 9 wherein the dispersion contains a co-solvent.

11. The dispersion of claim 10 wherein the co-solvent is N-methyl-pyrrolidone.

12. The dispersion of claim 8 wherein the diisocyanate is 4, 4'-diisocyanatodicyclohexylmethane.

13. The synthetic floor covering of claim 3 wherein the synthetic resin base is a reinforced polyvinylchloride mat.

14. A synthetic resin floor covering comprising a synthetic resin base and a yellowing resistant surface coating, said coating comprising an anionic polyurethane, said polyurethane comprising a chain extended isocyanate containing prepolymer, said prepolymer including carboxy groups neutralized with a tertiary amine composition comprising dimethylaminoethanol, said prepolymer being chain extended with a diamine comprising hydrazine.

15. A film comprising an anionic polyurethane, said polyurethane comprising a chain extended, isocyanate containing, prepolymer; said prepolymer including carboxy groups neutralized with a tertiary amine composition comprising dimethylaminoethanol, said prepolymer being chain extended with a diamine comprising hydrazine.

16. The dispersion of claim 1 wherein the isocyanate containing prepolymer has a molecular weight of from about 2,000 to about 20,000 and has the structural formula $$OCN(R_2)_nR_1NCO$$

where $R_2$ is independently at each occurrence,

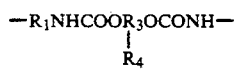

or $-R_1NHCOOR_6OCONH$ where $R_1$ is independently at each occurrence, the backbone residue of a diisocyanate selected from 4,4'-diisocyanatodicyclohexylmethane, tetramethylene xylylene diisocyanate or isophorone diisocyanate; $R_3$ is independently at each occurrence, the backbone residue comprising a glycol selected from 2, 2-dimethylolpropionic acid, and 1,4 bis(hydroxylmethyl) cyclohexane; $R_4$ is $-H$ or $-COO^-R_5^+$ where $R_5^+$ is the quaternary salt cation residue of dimethylaminoethanol; $R_6$ is independently at each occurrence, a polyester backbone of a number average molecular weight of about 1000 to 3000, formed by the reaction of a dicarboxylic acid or carboxylic acid anhydride with a polyol; and n is an integer of 1 through 10; provided that, sufficient $R_2$ is

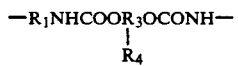

wherein $R_4$ is $-COO^-R_5^+$, to provide a salt number of 10 to 60; at least two $R_2$ groups are $-R_1NHCOOR_6OCONH-$; and at least 50 numerical percent of $R_1$ is the residue of 4,4'-diisocyanatodicyclohexylmethane.

17. The dispersion of claim 16 wherein the anionic polyurethane has a weight average molecular weight of from 1?,000 to 60,000 and has the structural formula $H(R_7)_aNH_2$ where $R_7$ is independently at each occurrence

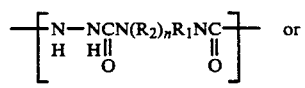

where a is an integer of from 2 to 15; provided that, at least numerical percent of $R_7$ is

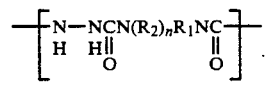

18. A polyurethane film comprising the dried dispersion of claim 16.

19. A polyurethane film comprising the dried dispersion of claim 17.

20. A floor covering comprising a synthetic resin base and a coating comprising the film of claim 18.

21. A floor covering comprising a synthetic resin base and a coating comprising the film of claim 19.

22. The dispersion of claim 1 further including a crosslinking agent.

23. The dispersion of claim 2 wherein the crosslinking agent is reactive with the carboxy groups.

24. The dispersion of claim 23 wherein the crosslinking agent comprises 2, 4, 6-tris (bisalkoxyalkyl) melamine.

25. The dispersion of claim 24 wherein the crosslinking agent is selected from 2, 4, 6-tris (bismethoxymethyl) melamine, 2, 4, 6-tris (bisbutoxymethyl) melamine, and mixtures thereof.

26. The polyurethane film of claim 2 wherein said film is crosslinked with a crosslinking agent comprising 2, 4, 6-tris-(bisalkoxyalkyl) melamine.

27. The polyurethane film of claim 26 wherein said film is crosslinked with 2, 4, 6-tris (bismethoxymethyl) melamine.

28. A synthetic floor covering comprising a synthetic resin base coated with the film of claim 26.

29. A synthetic floor covering comprising a synthetic resin base coated with the film of claim 27.

* * * * *

UNITED STATES PATENT AND TRADEMARK OFFICE
CERTIFICATE OF CORRECTION

PATENT NO. : 5,137,967
DATED : August 11, 1992
INVENTOR(S) : R. Alan Brown

It is certified that error appears in the above-identified patent and that said Letters Patent is hereby corrected as shown below:

In Claim 16, column 10, lines 9 and 10:

"—$R_1$NHCOOR-$_6$OCONH—" should read "—$R_1$NHCOOR$_6$OCONH—".

In Claim 17, column 10, line 14, "1?,000" should read "10,000".

In Claim 17, column 10, line 28, "least numerical percent" should read "least 50 numerical percent".

In Claim 23, column 10, line 45 "2" should read "22".

Signed and Sealed this

Seventeenth Day of November, 1992

Attest:

DOUGLAS B. COMER

Attesting Officer

Acting Commissioner of Patents and Trademarks